United States Patent [19]

Shaw et al.

[11] Patent Number: 4,617,445

[45] Date of Patent: Oct. 14, 1986

[54] CONTROL CIRCUIT AND METHOD FOR STUD WELDING GUN LIFTING SOLENOID

[75] Inventors: Richard G. Shaw; Theodore J. Fahrer, both of Dayton, Ohio

[73] Assignee: Erico International Corporation, Solon, Ohio

[21] Appl. No.: 651,460

[22] Filed: Sep. 17, 1984

[51] Int. Cl.$^4$ ................................................ B23K 9/20
[52] U.S. Cl. ........................................ 219/98; 219/99; 361/194
[58] Field of Search ..................... 219/98, 99; 361/194, 361/152, 154

[56] References Cited

U.S. PATENT DOCUMENTS

| | | | |
|---|---|---|---|
| 2,257,361 | 9/1941 | Yorkey | 361/154 |
| 3,414,700 | 12/1968 | Glorioso | 219/98 |
| 3,737,736 | 6/1973 | Stampfli | 361/194 |

Primary Examiner—Clifford C. Shaw
Attorney, Agent, or Firm—Renner, Otto, Boisselle & Lyon

[57] ABSTRACT

A solenoid power control circuit provides full power during lifting and reduced power during maintaining a lift condition in a lifting solenoid of an electric arc stud welding gun. During the stud lifting portion of a stud welding process, relatively high power is provided to the lifting solenoid to effect work necessary to accomplish the lift; but after a lifted condition has been achieved, the invention phases back power to reduce the energy dissipated while the stud and the lifting solenoid are maintained in lifted condition. A relaxation oscillator having two different charging time constants that can be selected to provide long or short phase delay is employed for the phase modulation control of lifting solenoid energization.

20 Claims, 6 Drawing Figures

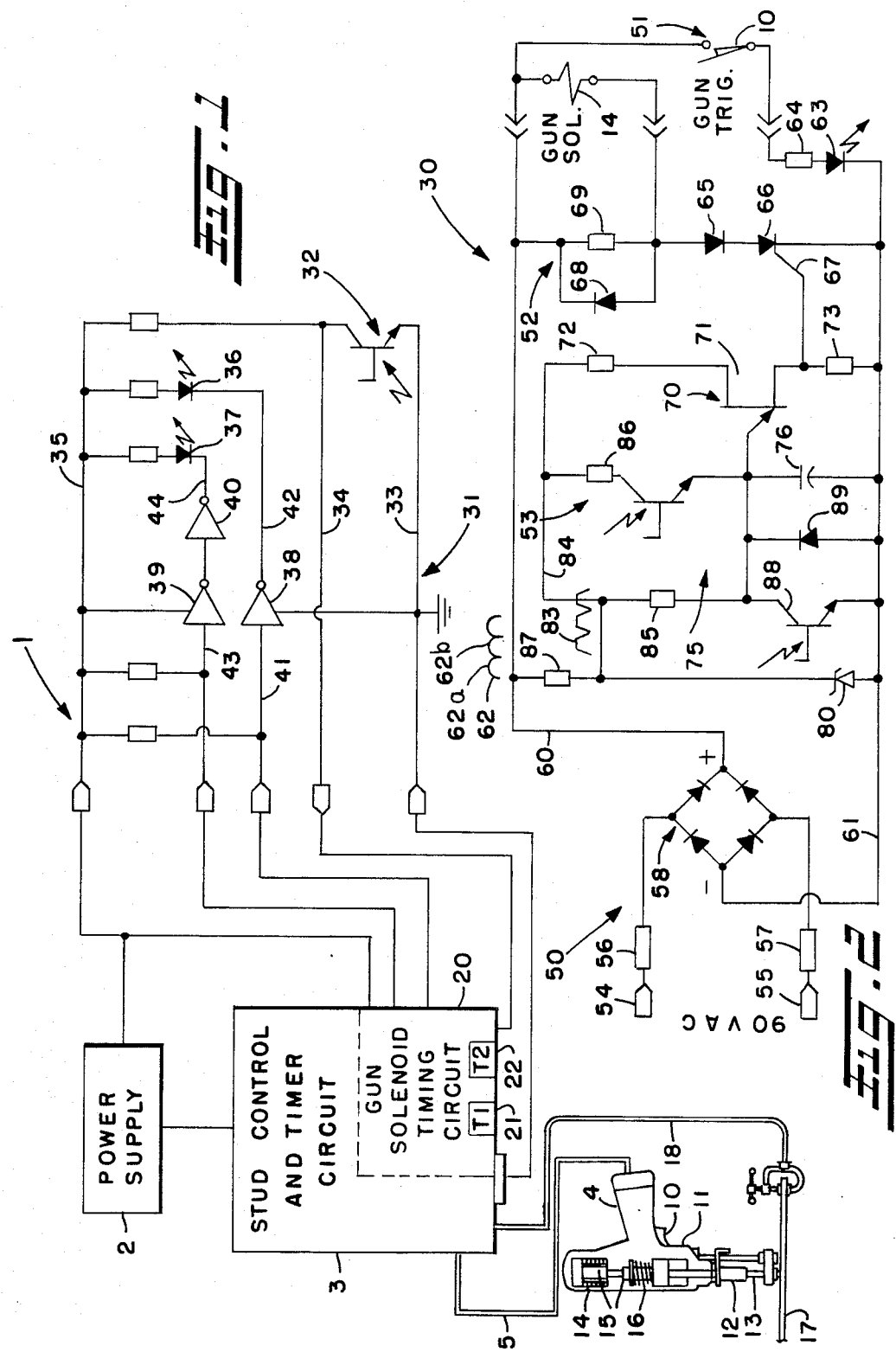

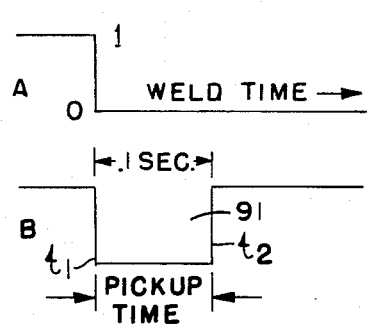
FIG. 3A
FIG. 3B
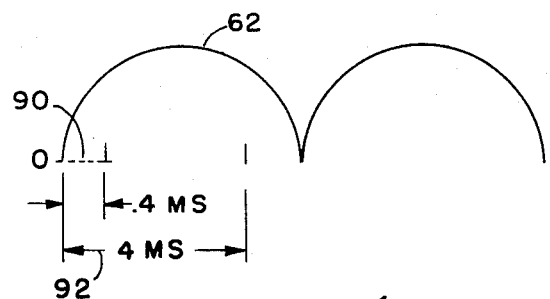
FIG. 4
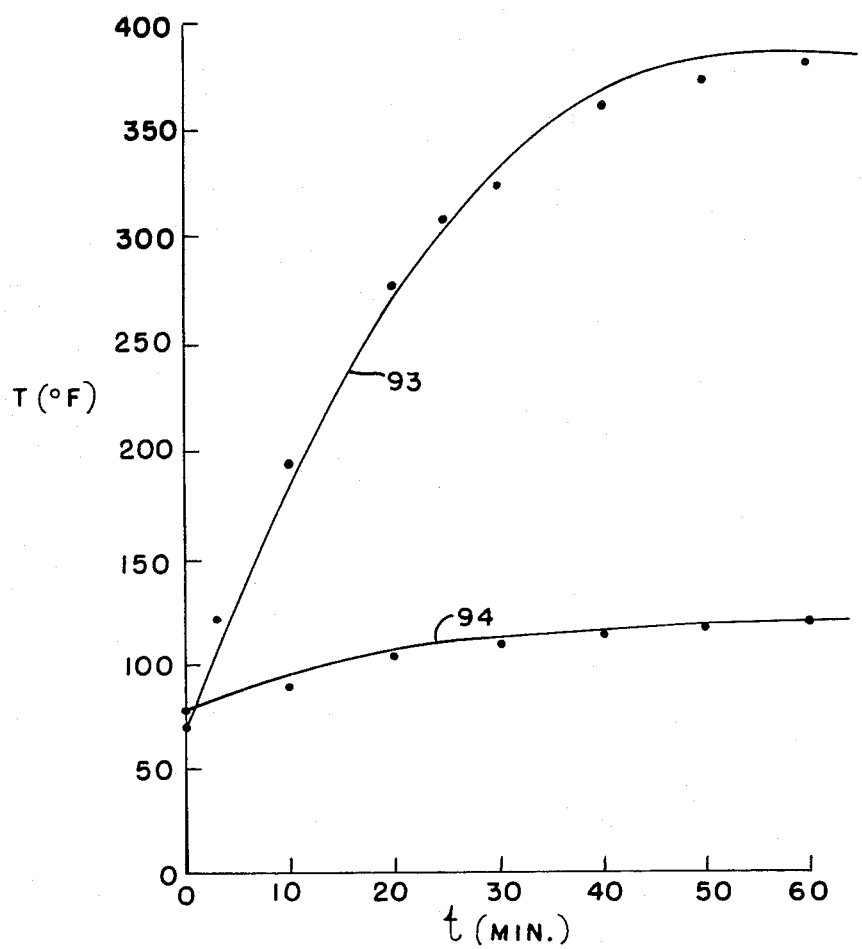
FIG. 5

4,617,445

CONTROL CIRCUIT AND METHOD FOR STUD WELDING GUN LIFTING SOLENOID

TECHNICAL FIELD

The present invention relates generally, as indicated, to the art of electric arc stud welding, and, more particularly, to a lifting solenoid power control circuit and method for providing relatively high and relatively lower power, respectively, during lifting and during maintaining of a lifted condition of the solenoid.

BACKGROUND

In the art of electric arc stud welding a stud welding gun usually is connected electrically to a power supply. The power supply provides power for welding and for control functions; and usually the power supply also includes appropriate control circuitry. An example of a power supply for stud welding is disclosed in U.S. Pat. No. 4,241,285, the entire disclosure of which hereby is incorporated by reference.

The stud welding gun usually includes a chuck into which a stud may be placed, a spring for normally urging the chuck and stud to an extended position with the stud engaging the workpiece, and a lifting solenoid capable of energization to pull in the solenoid armature to move the chuck and stud against the force of such spring thereby lifting the stud from a workpiece to which it is intended to be welded. Ordinarily during use of such a stud welding gun and power supply, the stud is placed into engagement with a workpiece to which it is to be welded; electrical power is provided to effect welding; the gun lifting solenoid is energized to lift the stud from the workpiece thereby drawing an electric arc between the stud and the workpiece; the stud and lifting solenoid are maintained in lifted condition or position relative to the workpiece or to a reference position with respect to the gun until adequate heat has been generated by the arc to effect conditioning, e.g. melting or partial melting, of the metal of the workpiece and/or stud for welding; and then the lifting solenoid is deenergized to allow the aforementioned spring to plunge the chuck and stud back toward the workpiece whereupon the stud becomes securely welded to the workpiece. Variations on such stud welding operation, of course, do exist, but fundamentally the aforementioned steps ordinarily are required to perform electric arc stud welding processes.

A problem encountered with prior art stud welding guns and power supplies is the excessive heat that is generated and accumulates in the lifting solenoid. When a stud welding gun is cycled frequently, i.e. used to weld many studs in a relatively short period of time, the lifting solenoid may overheat causing the insulation thereon, for example varnish, to melt. As a result the lifting solenoid may shortcircuit and become inoperable and the melted varnish or other insulation material may damage other parts of the stud welding gun. The gun then would have to be taken out of use for servicing, for example to replace the lifting solenoid and to clean and/or to repair other portions of the gun.

BRIEF SUMMARY OF INVENTION

It has been discovered that although the power and work required to lift a stud from a workpiece during an electric arc stud welding process against the force of the return spring may be relatively large, a much smaller amount of power and correspondingly smaller amount of work is required to maintain or to hold the armature in the pulled-in condition. The invention employs circuitry and methods to reduce power supplied to the lifting solenoid of an electric arc stud welding gun to maintain the solenoid in lifted condition relative to the power provided during the actual lifting operation. As a result the amount of power input to and consumed by the lifting solenoid is reduced relative to prior art electric arc stud welding systems; power is conserved and, importantly, the aforementioned problems caused by excessive heat in an electric arc stud welding gun lifting solenoid are avoided or in any event substantially reduced.

One object of the invention is to minimize build-up of heat or generation of heat in the lifting coil or solenoid of an electric arc stud welding gun.

Another object is to reduce and preferably to eliminate failures of the lifting coil or solenoid for such guns.

An additional object is to reduce the down time for servicing of such guns.

A further object is to reduce contamination of other parts of such guns due to failure of the gun lifting coil or solenoid.

These and other objects and advantages of the present invention will become more apparent from the following description with reference to the accompanying drawings.

In accordance with one aspect of the invention, a circuit for controlling operation of a stud welding gun lifting solenoid (solenoid and coil are used interchangeably herein), includes an input circuit for supplying electrical power having a cyclically varying characteristic, and a power control for controlling the coupling of such electrical power to such gun lifting solenoid, including a timing circuit for determining when a cycle of such electrical power such coupling is effected, and a time changing mechanism for changing the operation of the timing circuit to change the time when in a cycle of such electrical power such coupling is to be effected.

According to another aspect, in a power supply for an electric arc stud welding gun having a lifting solenoid, including an input circuit for supplying electrical power for welding and control purposes, and a stud control and timer circuit for coupling electrical power from the input circuit to the stud welding gun for welding, an improvement is characterized in a solenoid power control for controlling the coupling of electrical power from the input circuit to the lifting solenoid to provide relatively high power during lifting and relatively lower power to maintain the lifting solenoid in a lifted condition.

According to an additional aspect, a power supply for an electric arc stud welding gun having a lifting solenoid includes an input circuit for supplying electrical power for welding and control purposes, a stud control and timer circuit for coupling electrical power from the input circuit to the stud welding gun for welding, and a solenoid power control for controlling the coupling of electrical power from the input circuit to the lifting solenoid to provide relatively high power during lifting and relatively lower power to maintain such lifting solenoid in a lifted condition.

According to a further aspect, a method for electric arc stud welding wherein an electric arc stud welding gun having a lifting solenoid is used to weld a stud to a workpiece, electrical power from a source is supplied for welding and control purposes, and such electrical power is coupled to the stud welding gun for welding, an improvement is characterized in controllably coupling electrical power from such source to such lifting solenoid, including providing relatively high power during lifting and providing relatively lower power to maintain such lifting solenoid in a lifted condition.

These and other objects and aspects of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a schematic electric circuit diagram of an electric arc stud welding power supply and control circuit according to the invention;

FIG. 2 is a schematic electric circuit diagram of a lifting solenoid control circuit according to the invention used in conjunction with the power supply and control circuit of FIG. 1;

FIGS. 3A and 3B are schematic graphical representations of the weld time and pick-up time signals occurring in the power supply and control circuit of FIG. 1;

FIG. 4 is a schematic graphical representation of a full wave rectified power signal employed in the power supply and control circuit of FIG. 1; and FIG. 5 is a graph of the temperature versus time of use of a lifting solenoid used in a stud welding gun, one curve depicting the temperature/time relationship when the lifting solenoid control circuit of the invention is not used and one showing such characteristic when the lifting solenoid control circuit of the invention is employed.

DESCRIPTION OF THE PREFERRED EMBODIMENT

Referring now in detail to the drawings, wherein like reference numerals designate like parts in the several figures, and initially to FIG. 1, an electric arc stud welding power supply system is generally designated at 1. The power supply system 1 includes a power supply 2, for example of the type sold by Erico Products, Inc., Cleveland Ohio, under the model designation ESS 1500, which includes a stud control and timer circuit 3. Such power supply 2 may be connectable for input power from the utility company power lines and is capable of producing appropriate output power at a voltage and current satisfactory for stud welding, for example using a stud welding gun 4 connected by power and control cable 5 to the stud control and timer circuit 3. The stud welding gun 4 may be of a conventional type that includes a trigger 10, a main body 11, a chuck 12, which is relatively movable with respect to the main body and which is intended to carry a stud 13, a lifting solenoid 14, which has a movable, e.g. linearly, armature 15, and a return spring 16. The gun 4 may be a conventional stud welding gun which is used ordinarily in conventional manner to effect welding of the stud 13 to a workpiece 17, which is electrically connected by a cable 18 to the stud control and timer circuit 3 or other portion of the power supply 2 to complete a welding current circuit.

During use of the stud welding gun 2 in conjunction with the power supply system 1, a stud 13 would be loaded into the chuck 12, and the gun and stud are placed into engagement with the workpiece 17. The spring 16 urges the armature 15, chuck 12, and stud 13 toward the workpiece. Upon closure of the gun trigger switch 10, the stud control and timer circuit 3 functions to apply appropriate power on the cables 5, 18 to initiate the electric arc stud welding cycle. At some point during the cycle, usually at or near the beginning of a cycle, the lifting solenoid 14 is energized to pull the armature 15 in or away from the workpiece 17, thereby drawing the stud 13 away from the workpiece and, accordingly, drawing an electric arc between the stud and the workpiece. After a suitable time has expired, e.g. controlled, set or determined by conventional mechanical or electronic timer(s), the solenoid 14 would be disabled by the stud control and timer circuit 3, and then under the influence of the spring 16, the armature, chuck and stud are urged back toward the workpiece; such latter operation is known as plunging the stud into the workpiece to complete the welding cycle. The ESS 1500 power supply employs a stud control and timer circuit suitable for effecting such operation.

In the ESS 1500 power supply the stud control and timer circuit 3 includes a gun solenoid timing circuit portion 20, the purpose of which is to determine the times for energization and deenergization of the lifting solenoid 14. In accordance with the present invention the gun solenoid timing circuit 20 includes a detector for detecting closure of the gun trigger switch 10, a first timer, such as a mechanical or an electric timer $T_1$, which determines the overall duration that the gun lifting solenoid 14 will be energized, and a second timer $T_2$, which determines for how long the solenoid 14 will be energized at full power, or in any event adequate power to effect pulling in of the armature—the remaining period of energization of the solenoid 14 being at a reduced power to hold or to maintain the armature in the pulled-in position. Such timers $T_1$, $T_2$ are identified by reference numerals 21, 22 in FIG. 1.

According to the invention, then, the power supply system 1 includes the input power supply 2 for supplying electrical power for welding and control purposes, the stud control and timer circuit 3 for coupling electrical power from the supply 2 to the stud welding gun 4 for welding and for effecting appropriate timing and control functions, and a solenoid power control circuit 30 schematically illustrated in FIG. 2 and including the timers 21, 22 mentioned above and an interface circuit 31 for interfacing with the gun solenoid timing circuit 20 or other part of the stud control and timing circuit 3.

Briefly referring to the interface circuit 31 (FIG. 1), such circuit includes a photosensitive transistor or similar device 32, which receives a light input when the gun trigger 10 is closed, as is described in greater detail below. Such a light input to the transistor 32 effects a connection between a ground line 33 and a line 34, which is coupled to the gun solenoid timing circuit 20 to signal the latter of such gun trigger switch closure. Such signalling may be in the form of a logic 0 applied to line 34; alternatively, when the transistor 32 is non-conductive, a logic 1 signal is applied to line 34 from line 35, which also is connected to the power supply 2 and gun solenoid timing circuit in the stud control and timer circuit. The logic 1 signal on line 35 may be derived directly from the power supply 2 or, alternatively, via the stud control and timer circuit 3 and/or gun solenoid timing circuit 20. The interface circuit 31 also includes a pair of light emitting diodes 36, 37, which produce light outputs directed to respective photosensitive transistors in the solenoid power control circuit 30 described in greater detail below. Preferably the photosensitive transistor 32 and the light emitting diodes 36, 37 are one component of respective opto-isolator type devices, which enable optical interconnection between the interface 31 and the solenoid power control circuit 30 without the need for a direct electrical connection therebetween, thus providing appropriate electrical isolation, if desired.

Amplifiers, for example inverting amplifiers, 38, 39, 40 connect the respective light emitting diodes 36, 37, as is shown in FIG. 1, to the gun solenoid timing circuit 20. Accordingly, when the circuit 20 produces a logic 1 signal on line 41, the inverting amplifier 38 produces a logic 0 signal on line 42, whereupon the light emitting diode 36 emits a light output; on the other hand, a logic 0 signal on line 41 causes the light emitting diode 36 to terminate its light output. Moreover, a logic 0 signal on line 43 from the gun solenoid timing circuit 20 operates through the inverting amplifiers 39, 40 to produce a logic 0 signal on line 44 causing the light emitting diode 37 to produce a light output; conversely, a logic 1 signal on line 43 causes the diode 37 to terminate its light output.

Thus, upon closure of the gun trigger 10, the stud control and timer circuit 3, including circuit 20 thereof, detects the same, as will be described further below, and automatically effects appropriate timing and control for operation of the gun 4. Such timing and control would include operation of the timers 21, 22 to produce or to cause to be produced on the lines 41, 43 respective logic 1 and logic 0 signals during the course of a stud welding cycle in order to accomplish the full solenoid energization for lifting and reduced solenoid energization for maintaining or holding functions. If desired, the stud control and timer circuit 3 and/or the gun solenoid timing circuit 20 thereof may include computer control circuitry, such as a microprocessor, appropriate memory, input and output circuitry and components, and appropriate programming to accomplish the desired timing and control functions intended to be performed by the stud control and timer circuit 3 and/or gun solenoid timing circuit 20; in such event, the computer control circuitry may replace the mechanical or electronic timers 21, 22 and the functions thereof.

Turning now to FIG. 2, the solenoid power control circuit 30 of the invention is shown in detail. It is the purpose of the solenoid power control 30 to effect phase control modulation of the power provided to the gun lifting solenoid 14 in accordance with the logic signals, and, thus, the timing thereof, derived from the stud control and timer circuit 3 and, more particularly, the gun solenoid timing circuit 20 thereof. The solenoid power control circuit 30 includes a power input circuit 50, a gun trigger circuit 51, a gun solenoid energizing circuit 52, and a timing/phase control circuit 53. It is the purpose of the solenoid power control circuit 30 to effect phase control of the power provided the gun solenoid 14 thereby to provide relatively high power or relatively lower power thereto, dependng, respectively, on whether the solenoid is being used to pull in the armature, chuck and stud against the force of the return spring 16 or is intended to hold or to maintain the same in pulled in, withdrawn, lifted condition.

In the power input circuit 50, 90-volt AC power, for example, is provided from the power supply 2 via terminals 54, 55 and fuses 56, 57 to a full wave bridge rectifier 58. The output from the full wave bridge rectifier is provided on lines 60, 61 in the form of a full wave rectified AC signal represented at 62, which signal also is shown in FIG. 4. Such signal 62 has a cyclically varying characteristic in that each half cycle of the input AC power produces a positive half sinusoidal wave that has an amplitude varying between zero and maximum amplitude level. The use of such a cyclically varying signal 62 facilitates effectively automatic turn-off of the gun solenoid energizing circuit 52 at the conclusion of each half cycle 62a, 62b, etc. and, therefore, facilitates phase control.

The gun trigger circuit 51 includes the stud welding gun trigger switch 10, which is normally open, and a light emitting diode 63, which may be coupled as part of an opto-isolator with the photosensitive transistor 32. Accordingly, upon selective closure of the gun trigger switch 10, for example by manual operation of an operator of the stud welding equipment, a circuit is completed to couple the diode 63 across the lines 60, 61, whereupon the diode produces a light output. The photosensitive transistor 32 (FIG. 1) then produces a signal on line 34, for example a logic 0, which is detected by the stud control and timer circuit 3/gun solenoid timing circuit 20 to indicate such closure of the switch 10 and to initiate a welding cycle of operation. A resistor 64 limits current through the diode 63 when the switch 10 is closed.

In the gun solenoid energizing circuit 52 the gun lifting solenoid 14 is electrically connected in series with a diode 65 and an SCR 66. Other types of switchable components may be substituted for the SCR 66, as is well known in the art, to effect the appropriate energization of the solenoid 14, as is described further now. Upon receiving a gate or trigger pulse signal to the gate terminal 67 of the SCR 66, when the SCR 66 is appropriately biased, the SCR goes into conduction to complete an electric circuit from line 60, through the gun solenoid 14, diode 65, and SCR 66 to line 61. Conduction in the SCR 66 will only occur when the SCR is appropriately forward biased, and this occurs during each positive half cycle of the signal 62 when such signal is above or adequately above zero potential relative to ground, for example; the line 61 being considered at relative ground potential, for example. Accordingly, each time a given half cycle of the signal 62 goes to zero, the SCR 66 will stop conducting; and conduction in the SCR 66 will not occur again until the SCR is appropriately forward biased in the next half cycle and an appropriate gate signal is received on the gate terminal 67 of the SCR. When the SCR 66 stops conducting, the curent through the gun solenoid 14 cannot terminate instantaneously. Such gun solenoid then produces a counter emf, and the diode 65 protects the SCR 66 from such counter emf. The diode 68 provides for a flux reset with respect to the gun solenoid 14 when the SCR 66 is cut off.

In the timing/phase control circuit 53 a unijunction transistor oscillator 70, such as a relaxation oscillator or other type of device capable of producing gating signals in an appropriate timed relation to the signal 62 for delivery to the gate terminal 67 of the SCR 66, is illustrated. The oscillator 70 includes a unijunction transistor 71 having source electrodes coupled, respectively, to resistor 72, 73. The input or gate electrode 74 of the unijunction transistor 71 is connector to a variable timer 75, which includes a capacitor 76 intended to charge for prescribed time and upon reaching an appropriate voltage level to discharge through the unijunction transistor 71, as is known in the art of unijunction transistor oscillators. A zener diode 80 and resistor 81 provide a clipped full wave rectifier AC signal generally of square wave appearance, in any event a signal that follows and is synchronized in phase with the signal 62. Such signal 83 is applied to line 84 for delivery via resistor 72 to the unijunction transistor 71, for delivery via resistor 85 to the capacitor 76, and for delivery via resistor 86 to a photosensitive transistor 87. The photosensitive transistor 87 preferably is one component of an opto-isolator that also includes the light emitting diode 37 (FIG. 1). Accordingly, whenever the diode 37 produces a light output, the transistor 87 effects a connection of the resistor 86 to the capacitor 76 to form an RC charging-/timing circuit coupled to the unijunction transistor 71. A further photosensitive transistor 88 is coupled across the capacitor 76; the transistor 88 preferably is one component of an opto-isolator that includes the light emitting diode 36 (FIG. 1). A diode 89 also is coupled across the capacitor 76 and photosensitive transistor 88. According to the preferred embodiment and best mode of the invention, the resistor 86 is appreciably smaller than the resistor 85 to accomplish the desired operation described in greater detail below.

The gun solenoid 14 represents a rather substantial inductance. Accordingly, there is a large VI lag, which could create problems if appropriate synchronization provided by the solenoid power control circuit 30 were not achieved. For example, the voltage across the SCR 66 would be gone or nearly gone when the SCR would be fired, i.e. a gate signal provided to the gate terminal 67; and this would be undesirable because, for example, the SCR may not fire or may not fire at the desired time. The resistor 69 working in conjunction with the inductance of the gun solenoid coil 14 provides an LR circuit that reduces the phase lag. Therefore, it is possible to fire the SCR 66 relatively late into the phase or duty cycle of each half cycle of the power signal 62 during a hold or maintaining condition of the solenoid holding the armature in the pulled in condition or position.

The zener diode 80 and resistor 81 provide the signal 83 in full synchronization with the power signal 62 in order to synchronize the unijunction transistor 71 in such way that it will turn off at each zero going of the power signal 62. It is desirable for the unijunction transistor 71 to be synchronized to the power line 60, i.e. the signal 62, for proper phase control operation. The unijunction transistor 71 synchronizes better to a square wave type signal, such as that shown at 83, than to a varying power signal 62 of sinusoidal shape.

Operation of the electric arc stud welding power supply system 1 in conjunction with the solenoid power control circuit 30 and interface circuit 31 commences when an operator closes the gun trigger switch 10. Prior to such closure the gun solenoid timing circuit 20 ordinarily would produce a logic 1 signal on line 41 (FIG. 1) causing the light emitting diode 36 to emit light and the photosensitive transistor 88 (FIG. 2) to be conductive. Conduction through the transistor 88 effectively shortcircuits the capacitor 76 and prevents any firing of the unijunction transistor 71.

Upon closure of the switch 10, though, the light emitting diode 63 causes the photosensitive transistor 32 to produce a logic 0 signal on line 34. Such signal is represented in FIG. 3A as curve A which upon closure of the switch 10 drops from logic 1 to logic 0 level. The weld time of the entire welding cycle is a function of the duration of the curve A remaining at logic 0 level, which ordinarily is controlled automatically by the stud control and timer circuit 3, e.g. timer 21, and/or by the operator, at least in part, holding the switch 10 in closed condition.

After the weld time has commenced, the gun solenoid timing circuit 20 produces a logic 0 signal on line 41 causing the light emitting diode 36 to stop emitting light and the photosensitive transistor 88 to go out of conduction thereby allowing the capacitor 76 to charge. Preferably at the same time, which is represented at time $t_1$ in the curve B of FIG. 3B, or shortly thereafter, the gun solenoid timing circuit 20 also produces a logic 0 signal, i.e. the full power lift logic signal, on line 43, which causes the light emitting diode 37 to emit light and the photosensitive transistor 87 to become conductive. Such light emission and conduction in the photosensitive transistor 87 continues, for example, for the one-tenth second duration which terminates at time $t_2$ in FIG. 3B.

While the transistor 87 is conductive, the relatively small resistor 86 (compared to the relatively larger resistor 85) provides a relatively fast time constant charging of the capacitor 76. Although the resistor 85 is connected in parallel with the resistor 86 at this time, since the resistor 85 is relatively larger, for example by factor of about 8 to 15 times, the effect of the resistor 85 at this time is negligible. Accordingly, the capacitor 76 will charge relatively rapidly to a voltage level that is satisfactory to effect a break-down or firing of the unijunction transistor 71 whereupon the capacitor 76 will discharge through the unijunction transistor 71 and resistor 73 providing a gating signal on the gate terminal 67 of the SCR 66 firing the SCR to conduction. As is shown in FIG. 4, the SCR 66 fires approximately 0.4 ms. into each half cycle of the power signal 62; such phase delay of 0.4 ms. being represented at 90 in FIG. 4. Accordingly, a relatively maximum power is provided to the gun solenoid 14 over the duration between times $t_1$ and $t_2$ represented at 91 in FIG. 3B. Preferably the duration 91 is adequate to assure that the gun solenoid has pulled the armature, gun chuck and stud adequately away from the workpiece 17 (FIG. 1) against the force of the return spring 16.

At time $t_2$ (FIG. 3B) the timer 22 in the gun solenoid timing circuit 20 times out and causes a logic 1 signal to be produced on line 43, whereupon the light emitting diode 37 stops emitting light and the photosensitive transistor 87 becomes nonconductive or substantially so. The timer 21 in the gun solenoid timing circuit 20, however, continues to produce a logic 0 on line 41 so that the light emitting diode 36 will not emit light and the photosensitive transistor 88 will not be in conduction. Therefore, a relatively large time constant for charging the capacitor 76 is provided by the resistor 85 and capacitor 76 substantially delaying into each half cycle of the power signal 62 the firing of the SCR 66. Such phase delay is represented by the 4 ms. (for example) time period represented at 92 in FIG. 4. Due to such phase delay, the amount of power supplied to and consumed by the gun solenoid 14 during the holding or maintaining time is appreciably less than that supplied and consumed when pulling in the armature. The amount of phase delay and power reduction during the holding or maintaining condition of the solenoid 14 should be adequate to continue maintaining the stud withdrawn from the workpiece against the force of the return spring 16 while on the other hand minimizing the amount of power supplied and consumed by the solenoid and, thus, the heat generated thereby.

At the conclusion of the welding cycle, i.e. the weld time, the timer 21 in the gun solenoid timing circuit 20 would time out thereby producing a logic 1 signal on line 41 causing the light emitting diode 36 to emit light and the photosensitive transistor 88 to go into conduction. Accordingly, the capacitor 76 cannot charge and the SCR 66 cannot be fired. Therefore, the gun solenoid 14 will be deenergized and the return spring 16 can plunge the armature 15, chuck 12 and stud 13 toward the workpiece 17 to complete a weld between the stud and the workpiece.

Briefly referring to FIG. 5, two curves 93, 94 are illustrated. The curves 93, 94 graphically depict the significant difference in heat generated over a period of time during use of an electric arc stud welding gun, respectively, without and with the solenoid power control circuit 30 employed in conjunction with an electric arc stud welding power supply system 1. More specifically, the curve 93 shows the increase in temperature from approximately ambient temperature to approximately 380° F. in a onehour period with the stud welding gun being operated at approximately 6.8 cycles, i.e. welding operations, per minute. On the other hand, curve 94 shows the substantially lower temperature increase from ambient to a maximum of about 120° F. for an electric arc stud welding gun employed with an electric arc stud welding power supply system 1 and solenoid power control circuit 30 in accordance with the present invention, the gun being operated at approximately 5.9 welding operations or cycles per minute. Although the operation of the gun used when the curve 93 was derived was about one cycle per minute greater than operation of the gun when the curve 94 was derived, it is believed that such difference in number of cycles per unit time is relatively insignificant.

STATEMENT OF INDUSTRIAL APPLICATION

In view of the foregoing it will be appreciated that the electric arc stud welding power supply system 1 including the solenoid power control circuit 30 may be employed for use in stud welding processes.

We claim:

1. A circuit for controlling operation of a stud welding gun lifting solenoid, comprising
    input circuit means for supplying electrical power having a cyclically varying characteristic, and
    power control means, for controlling the coupling of such electrical power to such gun lifting solenoid, providing relatively high power during lifting mode and relatively lower power during holding mode, including
        timing circuit means, for determining when in each of a plurality of such cycles of such electrical power such coupling is effected, comprising alternate time constants, and
        time changing means for changing the operation of said timing circuit means to change the time when in each of such plurality of cycles of such electrical power such coupling is to be effected by selecting one time constant during lifting mode and another time constant during maintenance mode.

2. The circuit of claim 1, said input circuit means comprising a full wave rectifier for providing such electrical power as full wave rectified AC power.

3. The circuit of claim 1, said power control means comprising a phase modulation power control.

4. The circuit of claim 3, said phase modulation power control including an SCR.

5. The circuit of claim 3, said timing circuit means comprising a relaxation oscillator, and said time changing means comprising means for selectively changing the time constant of said oscillator.

6. The circuit of claim 5, said phase modulation power control being operable to effect relatively high power input to such gun lifting solenoid during lifting operation and subsequently a relatively lower power to such gun lifting solenoid during holding condition.

7. The circuit of claim 6, further comprising timer means for timing operation of said power control means and the respective durations of relatively high power and relatively lower power application to such gun lifting solenoid.

8. In a power supply for an electrical arc stud welding gun having a lifting solenoid, including
    input circuit means for supplying electrical power for welding and control purposes
    and stud control and timer circuit means for coupling electrical power from said input means to such stud welding gun for welding, the improvement comprising
    solenoid power control means for controlling the coupling of electrical power from said input circuit means to such lifting solenoid to provide relatively high power during lifting and relatively lower power to maintain such lifting solenoid in a lifted condition, and wherein said input circuit means comprises a rectifier for providing rectified AC power, and wherein said solenoid power control means comprises a phase modulation power control and
    said phase modulation control comprises a firing circuit to couple power to a solenoid with alternate time constants and means for selecting one time constant during lifting mode and another during maintenance mode.

9. The power supply of claim 8, said phase modulation power control comprising a relaxation oscillator and means for changing the time constant of such relaxation oscillator to determine the amount of phase modulation of electrical power provided to such lifting solenoid.

10. The power supply of claim 9, said relaxation oscillator comprising a unijunction transistor oscillator, and said phase modulation power control further comprising a triggerable switch selectively triggerable by said relaxation oscillator producing a gate signal and capable of terminating conduction in response to a prescribed condition of the electrical power provided thereto.

11. The power supply of claim 10, said triggerable switch comprising an SCR.

12. A power supply for an electric arc stud welding gun having a lifting solenoid, comprising
    input means for supplying electric power for welding and control purposes,
    stud control and timer circuit means for coupling electrical power from said input means to such stud welding gun for welding, solenoid power control means comprising phase modulation power control for controlling the coupling of electrical power from said input means to such lifting solenoid to provide relatively high power during lifting and relatively lower power to maintain such lifting solenoid in a lifted condition, said phase modulation power control comprising a triggerable switch for controlling the delivery of power to such lifting solenoid and a relaxation oscillator for providing gating signals to such triggerable switch, and timing circuit means for controlling the time constant of oscillation of said relaxation oscillator, and said stud control timer circuit means including timer means for controlling the timer circuit means to provide a relatively fast time constant for said relaxation oscillator during lifting by such lifting solenoid and a relatively slow time constant during relatively lower power operation of such lifting solenoid to maintain same in a lifted position.

13. The power supply of claim 12, said input means comprising a rectifier for providing rectified AC power for welding and control purposes.

14. The power supply of claim 12, said input means comprising a full wave rectifier for providing full wave rectified AC power to said phase modulation power control and to such lifting solenoid.

15. In a method for electric arc stud welding wherein an electric arc stud welding gun having a lifting solenoid is used to weld a stud to a work piece, electrical power from a source is supplied for welding and control purposes, and such electrical power is coupled to such stud welding gun for welding, the improvement comprising controllably coupling electrical power from such source to such lifting solenoid, including providing relatively high power during lifting and providing relatively lower power to maintain such lifting solenoid in a lifted condition, said controllably coupling comprising phase modulating electrical power from such source said phase modulating comprising selecting a relatively fast time constant for an oscillator to provide a relatively fast trigger signal to a triggerable switch during lifting mode and a relatively slow time constant for the oscillator to provide a relatively slow trigger signal to the triggerable switch during holding mode.

16. The method of claim 15, further comprising changing the amount of phase modulation during the course of a welding operation to provide relatively minimum phase modulation during lifting and relatively greater phase modulation to maintain such solenoid in lifted condition.

17. The method of claim 16, further comprising controlling the time during which such different amounts of phase modulations occur during a welding operation.

18. A circuit for controlling operation of a stud welding gun lifting solenoid, comprising input circuit means for supplying electrical power having a cyclically varying characteristic and power control means, a for controlling the coupling of such electrical power to such gun lifting solenoid, providin relatively high power during lifting mode and relatively lower power during maintenance mode, including timing circuit means including alternate time constants for determining when in a cycle of such electrical power such coupling is effected, time changing means for changing the operation of said timing circuit means to change the time when in a cycle of such electrical power such coupling is to be effected including means for selecting one time constant during lifting mode and another time constant during holding mode, and a phase modulation power control comprising a triggerable switch for controlling the delivery of power to such lifting solenoid and a relaxation oscillator for providing gating signals to the triggerable switch said phase modulation power control being operable to effect relatively high power input to such gun lifting solenoid during lifting operation and subsequently a relatively lower power to such gun lifting solenoid during holding condition.

19. The circuit of claim 18, further comprising timer means for timing operation of said power control means and the respective durations of relatively high power and relatively lower power application to such gun lifting solenoid.

20. A power supply for an electric arc stud welding gun having a lifting solenoid, comprising input means for supplying electrical power for welding and control purposes, stud control and timer circuit means for coupling electrical power from said input means to such stud welding gun for welding, and solenoid power control means for controlling the coupling of electrical power from said input means to such lifting solenoid to provide relatively high power during lifting and relatively lower power to maintain such lifting solenoid in a lifted condition, said solenoid power control means comprising a phase modulation power control, said phase modulation power control comprising a triggerable switch for controlling delivery of power to such lifting solenoid and a relaxation oscillator for providing gating signals to such triggerable switch, and further comprising timing means for controlling the time constant of oscillation of said relaxation oscillator, and said stud control and timer circuit means including timer means for controlling said timing means to provide relatively fast time constant for said relaxation oscillator during lifting by such lifting solenoid and relatively slow time constant during relatively low power operation of such lifting solenoid to maintain the same in a lifted condition.

* * * * *